United States Patent
Delano et al.

[11] B 3,914,469
[45] Oct. 21, 1975

[54] METHOD OF CONTROLLING SOLAR HEAT AND LIGHT IN GREEN HOUSES

[76] Inventors: Richard Delano, Box 96; Chad J. Raseman, 15 Blueberry Ridge Road, both of Setauket, N.Y. 11733

[22] Filed: Aug. 9, 1972

[21] Appl. No.: 278,991

[44] Published under the Trial Voluntary Protest Program on January 28, 1975 as document no. B 278,991.

[52] U.S. Cl. .............. 427/164; 47/17; 47/DIG. 6; 47/DIG. 7; 106/287 S; 427/165; 427/168; 427/407; 428/428; 428/441; 428/446; 350/1
[51] Int. Cl.$^2$.. B05D 5/00; G02B 13/00; A01G 9/22
[58] Field of Search .......... 47/17, DIG. 6; 117/33.3, 117/159, 138.8 R, 63, 124 A, 124 E, 169 A, 138.8 A; 106/287 S; 8/117, 118; 427/104, 165, 168, 407; 428/428, 441, 446

[56] References Cited
UNITED STATES PATENTS

| | | | |
|---|---|---|---|
| 1,786,205 | 12/1930 | Greider | 47/17 UX |
| 2,744,830 | 5/1956 | Manske | 106/84 |
| 3,224,901 | 12/1965 | Teicher | 117/138.8 E |
| 3,598,640 | 8/1971 | Bennett | 117/124 E |
| 3,652,379 | 3/1972 | White et al. | 117/138.8 R |
| 3,679,451 | 7/1972 | Marks et al. | 117/33.3 |

OTHER PUBLICATIONS

CPI Abstract 30608T-A, June 30, 1972, Derwent Publications.
Chem. Abstracts, 77:153222p, 1972.
Chemical Abstracts, Vol. 59:4169g, 1963.
Chemical Abstracts, Vol. 61: 13533c.

*Primary Examiner*—William D. Martin
*Assistant Examiner*—William H. Schmidt
*Attorney, Agent, or Firm*—Wyatt, Gerker, Shoup & Reardory

[57] ABSTRACT

A method of controlling the solar heat effect in glass and plastic covered greenhouses, and other windowed structures, consists of coating the greenhouses with an adhesive film consisting essentially of synthetic silicon dioxide having an average particle size of less than 10 microns and a film forming plastic resin. The film is translucent when dry but becomes transparent when wet. The film also extends the useful life of plastic coverings by reducing ultraviolet radiation.

11 Claims, No Drawings

METHOD OF CONTROLLING SOLAR HEAT AND LIGHT IN GREEN HOUSES

BACKGROUND OF THE INVENTION

The present invention relates to agricultural methods and more particularly to methods of greenhouse agriculture. At the present time glass or plastic covered greenhouses are coated, at certain seasons, with an opaque or translucent coating. For example, in the Northeastern United States a mixture of oil and chalk, or a lime whitewash, is spread on the outside of greenhouses in June, July or August. The mixture is wiped or worn off in September or October. Such coatings are used to prevent excessive build-up of heat within the greenhouses on sunny and hot days.

However, the coatings presently used do not solve many of the problems in greenhouse agriculture. Since the coating is maintained for a number of weeks or months, the coating reduces the effect of sunlight on those days, for example, cloudy or hazy days, when the sunlight is badly needed. The present coatings require a considerable amount of labor to apply and remove each year. The removal may be particularly difficult due to the relative inaccessability of portions of the greenhouse roof.

SUMMARY OF THE INVENTION

The present invention is directed to a method of coating the glass sheets or plastic film of greenhouses or other structures. The coating is intended to be relatively permanent and not be removed. It need not be reapplied seasonally. The coating is preferably white and is translucent, such that the amount of light permitted therethrough may be controlled by the thickness and density of the coating. When the coating is wet with water, it becomes almost transparent, permitting the passage of considerably more light therethrough than when dry.

Preferably the coating is applied on the inside of a greenhouse so that, in winter or on cloudy days, the humidity in the greenhouse will wet the coating and permit more sunlight to enter the greenhouse. However, on hot sunny days the greenhouse will have a relatively low humidity, the coating will remain dry, and less sunlight will pass therethrough, thereby preventing the heating of the greenhouse above the desired temperature. Alternatively, or additionally, the coating may be applied on the outside of the greenhouse. Rain will not wash the coating away and during rainy days more light may enter the greenhouse.

The coating is applied as a liquid, for example, by being brushed, rolled or sprayed on the glass or plastic surfaces. The liquid consists of a finely divided silica and a plastic film forming binding material. By years of experimentation it has been found that the essential ingredient is the fine synthetic silica and that other materials, including surfactants, anti-foamers, etc., may also be added to the liquid.

The plastic of the greenhouse or other structure may be in the same form as glass, i.e., a flat panel. Alternatively the plastic, for example, may be corrugated fiberglass panels. These are fairly rigid. The plastic may also be a film.

DETAILED DESCRIPTION OF THE INVENTION

The present invention is of a method of protecting greenhouse plants from excessive heat. The coating of this method may be applied by brushing, roller coating, and has been especially formulated so that it may be sprayed without clogging the nozzle of a sprayer. The coating, after it has dried the first time, will adhere well to glass or plastic surfaces. In that regard the adhesion of the coating has been tested on the plastic sheets and films commonly used in agriculture, including P.V.C. (polyvinylchloride), fiberglass and polyethylene and has been found to be highly adherent.

The essential ingredient of the coating is the synthetic silica of an average particle size of less than 10 microns. It has been found that the silica should be of this small particle size. This type of silica (silicon dioxide) is not to be confused with silica of larger particle size, such as glass sand. The silica used in the present invention is so finely divided that, in its dry state, it is fluffy and may be blown into the air as dust. It is even finer than sifted flour or talcum powder. The preferred material is "Syloid 266", Grade 86, of Grace-Davison Chemical, Baltimore, Maryland.

The silica preferred (Syloid silica gel 266-grade 86) has an average particle size of 2 microns, a bulk density of 0.5 bls. per cubic foot, and an average pore diameter of 150 Angstroms. It is 99.8% silicon dioxide with traces of $Al_2O_3$ . $TiO_3$ and $Na_2O$. A less satisfactory product is obtainable by using synthetic silica of slightly larger particle size, up to an average particle size of 10 microns (Syloid grades 64, 63 and 76).

The liquid for the coating also contains a plastic resin in emulsion form. The plastic resin, when dry, binds and adheres the synthetic silica to the glass or plastic surface. For brushing the liquid a satisfactory resin is a mixture of polyvinyl alcohol and methylcellulose. However, it is preferred that the liquid should be sprayed, for example, through the nozzle of an agricultural or paint sprayer. For that purpose it has been found that a polyvinyl acetate copolymer is preferable as the film forming resin. A satisfactory plastic resin is Nelco-900 of Northeastern Laboratories, Melville, New York. That product is a vinyl latex emulsion with a pH of 4.5-5.5, a viscosity of 68-75KU and provides, upon drying, a film which is adhesive, clear, glossy and flexible.

It has been found that the liquid for the coating should also contain other materials, such as a dispersant, an anti-foam, a thickener, and a wetting agent (surfactant). It has been found that a satisfactory dispersant is Tamol 731, Rohm & Haas, Philadelphia, Pennsylvania, a fluidity promoter for aqueous emulsion systems, which disperses the other materials in the water solution, placing an anionic charge on the particles. It is an active light colored liquid, a sodium salt of a carboxylate polyelectrolyte, obtainable at 25% solids in water from Rohm & Haas, Philadelphia, Pennsylvania.

A satisfactory anti-foaming material is NOPCO NXZ, of Nopco Chemical Division, Diamond-Shamrock, Newark, New Jersey, which is a defoamer used for emulsion systems. A satisfactory surfactant is Triton X-100 or Triton 770, both from Rohm & Haas. The preferred thickener is hydroxyethyl cellulose, such as "Natrasol" of Hercules, Inc., Wilmington, Delaware. An alternative thickener is "Acrysil 1%" from Rohm & Haas. Hydroxyethyl cellulose is a cellulose ether which is a nonionic water-soluble polymer. It forms, with the addition of a resin and a catalyst, a water-insoluble film. In addition, it is preferred to use the chemical "D.M.E.A." which is N,N-dimethyl ethanolamine, i.e., 2-(dimethylamino) ethanol, Chem. Abstracts Reg. No. 108-01-0, and is obtainable from Union Carbide, New York City. Also the chemical "Shell Sol 140" from Shell Chemical Co., New York City, has been used as a solvent. It is a blend of aromatic, cycloparaffinic and aliphatic hydrocarbon factions which is 93.6% saturates.

It will be understood that the following examples are given by way of illustration only and not as limitations on the products used in the method of the present invention. The following examples provide a concentrated liquid which is shipped to the greenhouse customer. The customer will then dilute the concentrated liquid 2 or 3 times, by liquid measure, with water. The diluted solution will be stirred by the customer and applied by him to his glass or plastic greenhouse surface, for example, by spraying.

EXAMPLE I

One adds the dispersant Tamol 731 (25% solution) in the amount of 12/64 oz. to 14 oz. of water, all quantities being expressed in weight. Then 12/64 oz. of the solvent Shell Sol 140 and 2/64 oz. of the anti-foamer Nopco NXZ and 4 oz. of the fine synthetic silica Syloid 266 and 9/64 oz. of DMEA and 1 and 24/64 oz. of the copolymer emulsion Nelco 900 are added to the mixture and the mixture stirred at room temperature for about 10 minutes. Then 2 oz. of Natrosol solution (1.83%) are added and the mixture again stirred. This produces the concentrated liquid which is shipped as a concentrate. The concentrated liquid is subsequently diluted by the user, and the dilute solution sprayed onto the greenhouse. The concentrated solution has a specific gravity of about 1.1, a pigment volume content of about 0.44 and a pH of 9.6. The concentrated solution has about, by weight, 72% water, 18.2 % synthetic silica (Syloid 266), 6.2% of the clear film forming plastic resin emulsion (Nelco 900), and the remainder the anti-foam, dispersant, solvent, DMEA, and thickener.

EXAMPLE II

To 800 cc. of water is added 4 cc. of Na OH (25% solution) to make the solution base. Then 150 grams (dry weight) of synthetic silica 266, grade 86, and 30 cc. of a vinyl-acrylic paste (Jacco paste from Jacco Paint Products, Ronkonkoma, New York) and 80 cc. of Acrysil (1%) are stirred together. The Acrysil is a thickener available from Rohm & Hass. Water is then added to make 1000 cc. total of concentrated solution which is bottled and shipped. The user dilutes the concentrated solution with 2 or 3 times the quantity of water and applies the diluted solution as a coating to the greenhouse.

It is sometimes preferable that the coating be removable and yet still be resistant to water. For this purpose it is preferred that the coating be removable by an ammonia solution and so the quantity of the resin emulsion may be reduced in the mixture.

It has been shown how the method of the present invention, used inside or outside of a glass sheet or plastic covered greenhouse, helps control the amount of solar heat and light. In the warm season the reduced solar heat results in a saving in labor and power costs in cooling the greenhouse. When applied on the inside of the greenhouse the humidity will keep it wet during the winter and thus it will be clear (transparent). The winter condensation will flow in a sheet or laminar fashion off the greenhouse walls and will not fall on the plants, i.e., a drip-free greenhouse. In the winter heating costs will be reduced compared to keeping the greenhouse roof and walls coated with a translucent coating. The inside or outside coating may be sprayed with water to make it transparent, for example, during sunny but cool days. The coating may be removed by rubbing with water or an ammonia solution.

The cost of operating air conditioning equipment in greenhouses or other structures can be reduced by using the coating in the summer. The coating, in its water-dry state, reduces excessive solar heat and light. In winter the coating, while in its water-wet state, will transmit desired solar heat and light. Heating and lighting costs can be reduced and the extra light utilized by the plants.

The coating, when applied to the outside of a plastic surface, will extend the useful life of the plastic because the amount of ultraviolet light in solar radiation is reduced before it reaches the plastic. Plastics are degraded and decomposed, at varying rates, by ultraviolet radiation. Premium priced UVR (Ultra Violet Resistant) polyethylene and PVC (polyvinylchloride) plastics are examples of attempts to reduce the effect of ultraviolet radiation attack and thus increase the useful life of the plastic. But even these plastics will benefit from an external application of the coating of the present invention.

It will be apparent that modifications may be made in the present invention within the scope of the subjoined claims. For example, the coating may be applied to the glass sheets or plastic resin film by dipping them in the liquid solution before the greenhouse is covered with the glass or plastic film. A carrier other than water, for example, an organic solvent non-harmful to plastic, may be used. As another example, thin coats of the coating of the present invention may be applied to both the exterior and the interior surfaces of greenhouses. The method may be used with structures similar to greenhouses, such as pool enclosures and plastic film strips laid on plant beds.

We claim:

1. A method of controlling the amount of solar heat and light which enters a glass or plastic covered greenhouse or similar enclosure comprising the steps of coating a liquid on the glass or plastic film of the greenhouse, the liquid including a carrier, a finely divided synthetic silica whose average particle size is in the micron range and is less than 10 microns, and a transparent film forming plastic resin, permitting the liquid to dry thereby forming an adherent dry non-transparent coating on the glass or plastic film, and including the further subsequent step of repeatedly permitting the wetting of the said dry non-transparent coating on the glass or plastic surface of said greenhouse with water to make the coating transparent and permitting it to dry between each wetting to make the coating non-transparent.

2. The method of claim 1 wherein the average particle size of the silica is about 2 microns.

3. The method of claim 1 wherein the liquid also includes, a dispersant and an anti-foamer.

4. The method of claim 1 wherein the liquid also includes N,N-dimethyl ethanolamine.

5. The method of claim 1 wherein the film forming resin is a vinyl resin.

6. The method of claim 1 wherein the coating step comprises spraying the liquid.

7. A method of protecting glass or plastic covered greenhouses and similar enclosures from excessive heat consisting of coating the glass or plastic surface of the greenhouse with an adhesive coating, the coating consisting essentially of a synthetic silicon dioxide having an average particle size in the micron range and of less than 10 microns and a transparent film forming plastic resin thereby forming an adherent dry non-transparent coating on the glass or plastic film, and including the further subsequent step of repeatedly permitting the wetting of the said dry non-transparent coating on the glass or plastic surface of said greenhouse with water to make the coating transparent and permitting it to dry between each wetting to make the coating non-transparent.

8. The method of claim 7 wherein the average particle size of the silica is about 2 microns.

9. The method of claim 7 wherein the liquid also includes a dispersant and an anti-foamer.

10. The method of claim 7 wherein the liquid also includes N,N-dimethyl ethanolamine.

11. The method of claim 7 wherein the film forming resin is a vinyl resin.

* * * * *